United States Patent [19]

Röber et al.

[11] Patent Number: 5,512,342
[45] Date of Patent: Apr. 30, 1996

[54] MULTILAYER PLASTIC PIPE

[75] Inventors: Stefan Röber; Hans Jadamus, both of Marl; Michael Böer, Oer-Erkenschwick; Roland Feinauer, Marl; Hans-Dieter Herrmann, Marl; Hans Ries, Marl, all of Germany

[73] Assignee: Huels Aktiengesellschaft, Marl, Germany

[21] Appl. No.: 187,736

[22] Filed: Jan. 28, 1994

[30] Foreign Application Priority Data

Oct. 25, 1993 [DE] Germany ............... 43 36 290.7

[51] Int. Cl.$^6$ .................................. B32B 27/00
[52] U.S. Cl. .................... 428/36.91; 428/36.7
[58] Field of Search .............. 428/36.91, 474.4, 428/475.2, 475.5, 480, 36.7, 421; 138/137, DIG. 7, 118, 140, 141, 177

[56] References Cited

U.S. PATENT DOCUMENTS

| | | | |
|---|---|---|---|
| 4,415,706 | 11/1983 | Staas | 525/183 |
| 4,563,393 | 1/1986 | Kitagawa et al. | 428/412 |
| 4,727,117 | 2/1988 | Hallden-Abberton et al. | 525/343 |
| 4,874,817 | 10/1989 | Inskip et al. | 525/183 |
| 4,971,847 | 11/1990 | Freed | 428/36.7 |
| 5,258,213 | 11/1993 | Mügge et al. | |

FOREIGN PATENT DOCUMENTS

| | | |
|---|---|---|
| 0464561 | 1/1992 | European Pat. Off. . |
| 0523644 | 1/1993 | European Pat. Off. . |
| 0551094 | 7/1993 | European Pat. Off. . |
| 0559445 | 9/1993 | European Pat. Off. . |
| 2577564 | 8/1986 | France . |

OTHER PUBLICATIONS

Research Disclosure, No. 321, Jan. 1991, pp. 68A–68B, M. P. Hallden–Abberton, et al., "Control of Functionality in Glutarimide Polymers".

Research Disclosure, No. 320, Dec. 1990, pp. 956–957, W. N. Dintinger, et al., "Enhancement of Properties of Polyglutarimides when Compounded with Small Amounts of Polyamides".

Primary Examiner—Charles R. Nold
Attorney, Agent, or Firm—Oblon, Spivak, McClelland, Maier & Neustadt

[57] ABSTRACT

A plastic pipe having improved resistance, inter alia, to methanol-containing fuels and improved mechanical properties, comprising at least:

(I) an outer layer,
(III) an inner layer comprising a moulding composition based on polyvinylidene fluoride, and
(II) an intermediate layer disposed between said inner layer (I) and said outer layer (III) comprising a moulding composition based on a mixture of
  (a) polyamide, and
  (b) polyglutarimide, wherein the adjacent layers (I) to (III) are each adhesively bonded to one another.

20 Claims, No Drawings

MULTILAYER PLASTIC PIPE

FIELD OF THE INVENTION

The present invention relates to a multilayer plastic pipe comprising at least three layers.

BACKGROUND OF THE INVENTION

Plastic pipes made from polyamide have previously been employed for a variety of applications. It is known that in order to achieve their objective, the pipes must be, inter alia, inert to the medium flowing in them, and must be resistant to high and low temperatures and mechanical stresses.

Single-layer pipes are not always capable of satisfying the necessary requirements. In the case of transport of, for example, aliphatic or aromatic solvents, fuels or the like, they exhibit considerable disadvantages, such as a poor barrier action to the medium, undesired changes in dimension or inadequate resistance to mechanical stresses.

Attempts to overcome these disadvantages have included the use of multilayer pipes (DE-A 35 10 395; DE-A 37 15 251; DE-A 38 21 723; DE-A 40 01 125 and DE-A 40 01 126). However, practical implementation of these proposals has shown that, although some disadvantages can be overcome, the overall property profile is still unsatisfactory.

French Patent 2 602 515 describes a two-layer pipe comprising an outer layer of nylon 11 and an inner layer of plasticized polyvinylidene fluoride. However, investigations have shown that the barrier action to the flowing medium is unsatisfactory.

In particular, permeation of methanol-containing fuels has only been reduced to an inadequate extent by means of the abovementioned proposals.

Reduction in permeation by using novel intermediate layers is therefore of crucial importance because, in particular, the legally permitted emission values are constantly being reduced.

SUMMARY OF THE INVENTION

Accordingly, one object of the present invention is to develop a polyamide pipe having a good barrier action with respect to the transported medium, in particular to methanol-containing fuels, satisfactory dimensional stability, for example at high and low temperatures, and satisfactory resistance to mechanical stresses.

The present inventors have now found that this object is achieved by a multilayer plastic pipe which comprises at least (I) an outer layer, (II) an intermediate layer disposed between the inner layer (I) and the outer layer (III) comprising a moulding composition based on a mixture of
  (a) polyamide, and
  (b) polyglutarimide, (III) an inner layer comprising a moulding composition based on polyvinylidene fluoride, wherein adjacent layers (I) to (III) are each adhesively bonded to one another.

DETAILED DESCRIPTION OF THE PREFERRED EMBODIMENTS

Suitable polymers for the outer layer (I) and for component (IIa) are aliphatic homo- and copolyamides. Suitable polyamides which can be used as components (I) and (IIa) can be identical or different.

Suitable polyamides include polyamides 4.6, 6.6, 6.12, 8.10, 10.10 or the like. Preferably, polyamides 6, 10.12, 11, 12.12 and in particular 12 are used. The designation of the polyamides corresponds to the international standard, where the first number(s) indicates the number of carbon atoms in the starting diamine and the last number(s) indicates the number of carbon atoms in the dicarboxylic acid. If only one number is given, it indicates that the starting material was an α,ω-aminocarboxylic acid or the lactam derived therefrom (H. Domininghaus, Die Kunststoffe und ihre Eigenschaften [Plastics and their properties], page 272, VDI-Verlag (1976)).

Suitable copolyamides include, for example, adipic acid, sebacic acid, suberic acid, isophthalic acid or terephthalic acid as co-acid or bis(4-aminocyclohexyl)methane, trimethylhexamethylenediamine, hexamethylenediamine or the like as co-diamine. These polyamides and copolyamides can be prepared using conventional methods (for example D. B. Jacobs, J. Zimmermann, Polymerization Processes, pp. 424–67, Interscience Publishers, New York (1977); DE-B 21 52 194).

Other suitable polyamides include mixed aliphatic/aromatic polycondensates which are described, for example, in U.S. Pat. Nos. 2,071,250; 2,071,251; 2,130,523; 2,130,948; 2,241,322; 2,312,966; 2,512,606 and 3,393,210, and in Kirk-Othmer, Encyclopedia of Chemical Technology, 3rd edition, vol. 18, Wiley & Sons (1982), pp. 328 and 435. Other polycondensates which are suitable as the polyamides are poly(ether ester amides) and poly(ether amides). Such products are described, for example, in DE-A 27 12 987, DE-A 25 23 991 and DE-A 30 06 961.

The number average molecular weight of the polyamides is suitably greater than 5,000 g/mol, preferably greater than 10,000 g/mol. These molecular weights correspond to a relative viscosity ($\eta_{rel}$) in the range of from 1.65 to 2.4.

Preferably polyamides which contain $\leq 50\%$ of amino end groups, in particular <20% of amino end groups are used.

The polyamides of the outer layer (I) and the component (IIa) can contain up to 40% by weight of other thermoplastics, provided that these do not adversely affect the properties according to the invention. Suitable thermoplastics include polycarbonate (H. Schnell, Chemistry and Physics of Polycarbonates, Interscience Publishers, New York (1981)), acrylonitrile/styrene/butadiene copolymers (Houben-Weyl, Methoden der organischen Chemie [Methods of Organic Chemistry], vol. 14/1, Georg Thieme Verlag, Stuttgart, pp. 393–406; Ullmanns Encylopädie der technischen Chemie [Ullmann's Encyclopedia of Industrial Chemistry], 4th edition, vol. 19, Verlag Chemie, Weinheim (1981), pp. 279–284), acrylonitrile/styrene/acrylate copolymers (Ullmanns Encyclopädie der technischen Chemie [Ullmann's Encyclopedia of Industrial Chemistry], 4th edition, vol. 19, Verlag Chemie, Weinheim (1981), pp. 277–295), acrylonitrile/styrene copolymers (Ullmanns Encyclopädie der technischen Chemie [Ullmann's Encyclopedia of Industrial Chemistry], 4th edition, vol. 19, Verlag Chemie Weinheim (1981), pp. 273 ff.) or polyphenylene ethers (DE-A 32 24 691 and DE-A 32 24 692, and U.S. Pat. Nos. 3,306,874; 3,306,875 and 4,028,341).

If necessary, the polyamides can be impact-modified. Suitable modifiers are, for example, ethylene/propylene or ethylene/propylene/diene copolymers (EP-A 295 076), polypentenylene, polyoctenylene or random or block copolymers made of alkenyl-aromatic compounds with aliphatic olefins or dienes (EP-A 261 748). Alternatively, the modifier can be an impact-modifying rubber such as core/shell rubber having a tough, resilient core of (meth)acrylate, butadiene or styrene/butadiene rubber having glass transition temperatures $T_g$ of $<-10°$ C. where the core may be crosslinked. The shell can be built up from styrene and/or methyl methacrylate and/or further unsaturated monomers (DE-A 21 44 528 and 37 28 685). The proportion of impact-modifying component should be selected so that the desired properties of the multilayered plastic pipe are not impaired.

In addition to polyamide as component (IIa), the intermediate layer (II) also contains component (IIb). Suitably, component (IIb) is a polyglutarimide which comprises the following basic building blocks:

i) <100% by weight, preferably from 10 to 60% by weight, of

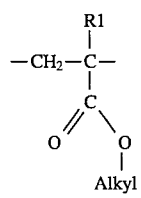

ii) <100% by weight, preferably from 30 to 80% by weight, of

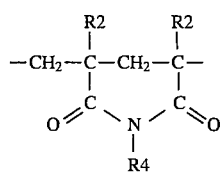

iii) <20% by weight, preferably from 2 to 10% by weight, of

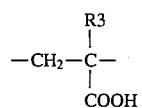

iv) from 1.2 to 20% by weight, preferably from 1.5 to 12% by weight, particularly preferably from 2 to 10% by weight, of

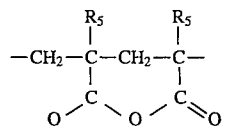

where Alkyl is methyl, ethyl, propyl, butyl, or hexyl, and $R_1$ to $R_5$, identical or different, are hydrogen or $(C_nH_{2n+1})$ where n is an integer of from 1 to 6. Preferably, Alkyl and $R_1$ to $R_5$ are each methyl radicals.

The stated polymers of component (IIb) are designated as polyglutarimides because they are poly(alkyl)acrylic esters in which two adjacent carboxylate groups have been reacted to form a cyclic imide. The imide is preferably formed using ammonia or primary amines, such as methylamine. Polyglutarimides can be prepared by conventional methods (Hans R. Kricheldorf, Handbook of Polymer Synthesis, Part A, Verlag Marcel Dekker Inc.; New York Basel—Hong Kong, pp. 223 f.; H. G. Elias, Makromoleküle [Macromolecules], Hüthig und Wepf Verlag, Basel Heidelberg—New York; U.S. Pat. Nos. 2,146,209 and 4,246,374).

The polyglutarimides used according to the invention suitably have a melt flow index of <30 g/10 min, preferably from 0.2 to 10 g/min.

To increase the low temperature impact toughness, the polyglutarimides can also contain appropriate modifiers. Suitable modifiers include core/shell polymers having a polybutyl acrylate core and a shell of polymethyl methacrylate and/or polyglutarimide. In addition to the examples mentioned, other conventional modifiers can be used.

The moulding composition for the layer (II) is prepared by conventional and known processes by melt mixing the components (IIa) and (IIb) in a mixer having a good kneading action, such as, for example, a twinscrew kneader, at temperatures which depend on the melting points of components (IIa) and (IIb), in general at temperatures between 230° and 330° C.

The moulding composition for the layer (II) can also be prepared directly in a feed extruder which is used for the production of the multilayer pipes in the coextrusion facility or injection-moulding facility used, so that the moulding composition for the layer (II) can be processed into a layer of the multilayer pipe directly after its preparation, without further intermediate storage.

The components (IIa) and (IIb) are used in a weight ratio of from 40 to 90: of from 50 to 10, preferably of from 60 to 80: of from 40 to 20.

The inner layer (III) contains, in particular, polyvinylidene fluoride which is preferably used in plasticizer-free form. Polyvinylidene fluoride can be prepared by conventional methods (Hans R. Kricheldorf, Handbook of Polymer Synthesis, Part A, Verlag Marcel Dekker Inc., New York—Basel—Hong Kong, pp. 191 ff.; Kunststoff Handbuch [Plastics Handbook], 1st edition, vol. XI, Carl Hanser Verlag, Munich (1971), pp. 403 ff.).

Copolymers based on polyvinylidene fluoride containing up to 40% by weight of other monomers may also be incorporated according to the invention. Suitable additional monomers include trifluoroethylene, ethylene, propene and hexafluoropropene.

The polyvinylidene fluoride of the invention suitably has a melt flow index of <17 g/10 min, preferably from 2 to 13 g/10 min. (DIN 53 735).

Preferably, layer (III) is electrically conductive (surface resistance $<10^9\Omega$). Particular preference is given to an inner layer (III) which comprises (a) an outer layer based on polyvinylidene fluoride and (b) an adjacent layer on the inside which is electrically conductive and has a surface resistance of $<10^9\Omega$. Good electrical conductivity can be achieved by adding up to 15% by weight of, for example, conductive carbon black, carbon fibers or the like.

The moulding compositions for the layers (I) to (III) may include conventional auxiliaries and additives such as, for example, flameproofing agents, stabilizers, plasticizers, processing aids, viscosity improvers, fillers, in particular those for improving the conductivity, pigments or the like. The amount of said agents should be metered such that the desired properties are not seriously affected.

The manufacture of the multilayer pipes is carried out in a known manner, for example as described in the references discussed above. The pipes are preferably produced by coextrusion.

In the preferred embodiment, the multilayer pipes have a 3-layer structure in which the order of the layers is (I)/(II)/(III).

In a 3-layer pipe according to the invention having an external diameter of 8 mm and a total wall thickness of 1 mm, the layer thicknesses can be, for example, from the outside to the inside 0.8 mm/0.1 mm/0.1 mm. According to the invention, other distributions of layer thickness are also conceivable, for example with a thicker inner layer of, for example, 0.2 mm.

Furthermore, it is also possible to produce, besides a 3-layer pipe, other types of pipe having more than 3 layers. In addition, it is possible to use the same polyamide type for the layer (I) and the component (IIa). In a further embodiment, the material used for the layer (I) may be of the same type as the component (II).

The multilayer pipes of the invention have an outstandingly good resistance to, and a good barrier action with respect to diffusion of, (petro)chemical substances, solvents and fuels. In addition, the adjacent layers are adhesively bonded to one another, so that delamination of the adjacent layers does not occur, for example, during thermal expansion or flexing of a pipe.

The plastic pipes of the invention are preferred for use in the transport of (petro)chemical substances or in the motor vehicle sector for carrying brake, cooling and hydraulic fluids and also fuel. A further application of the multilayer pipes is the production from them of hollow bodies such as tanks or filling ports, in particular for the motor vehicle sector.

Having generally described this invention, a further understanding can be obtained by reference to certain specific examples which are provided herein for purposes of illustration only and are not intended to be limiting unless otherwise specified.

EXAMPLES

The stated parameters were determined by means of the following measurement methods.

The determination of the solution viscosity (relative viscosity $\eta_{rel}$) of the polyamides is carried out using a 0.5% strength by weight m-cresol solution at 25° C. in accordance with DIN 53 727/ISO 307.

For the determination of the amino end groups, 1 g of the polyamides is dissolved in 50 ml of m-cresol at 25° C.. The solution is titrated potentiometrically with perchloric acid.

For the determination of the carboxyl end groups in the polyamides, 1 g of polycondensate is dissolved in 50 ml of benzyl alcohol under a blanket of nitrogen at 165° C. The dissolution time is a maximum of 20 minutes. The solution is titrated with a solution of KOH in ethylene glycol (0.05 mol of KOH/l) against phenolphthalein until the color changes.

The determination of the melt flow index of the polyglutarimides is carried out at 230° C. and under a load of 3.8 kg (DIN 53 735).

The determination of the melt flow index of the polyvinylidene fluorides is carried out at 230° C. and under a load of 5 kg (DIN 53 735).

The testing of the ease of mechanical separation at the interface is carried out using a metal wedge (edge angle: 5°; loading weight: 2.5 kg); this test attempts to separate the material boundary layer to be tested. If separation takes place at the interface between the components, the adhesion is poor. If, by contrast, the separation takes place wholly or partly within one of the two components, good adhesion is present.

The determination of the diffusion of fuel components is carried out on pipes using a fuel mixture (fuel M 15:42.5 parts by volume of isooctane, 42.5 parts by volume of toluene and 15 parts by volume of methanol) at 23° C. and 50% atmospheric humidity. The samples, having a length of 200 mm, are filled with the fuel mixture and are connected to a filled stock tank during the measurement. Diffusion is determined as the loss in weight by diffusion over time (measurement every 24 hours). The measure indicated is the weight loss recorded per unit area, measured when the diffusion process has achieved equilibrium, i.e. when the weight loss determined per 24 hours no longer changes with time.

Examples denoted by letters are not according to the invention.

A. Component I

PA 1: Polyamide 12 ($\eta_{rel}$; plasticizer content: 0; amino end group content: 9 mmol/kg; carboxyl end group content: 48 mmol/kg; VESTAMID® L 2140—HÜLS AG)

PA 2: Polyamide 12 ($\eta_{rel}$: 2.1; plasticizer content per 100 parts by weight of polyamide: 15 parts by weight of N-n-butylbenzenesulphonamide; amino end group content: 9 mmol/kg; carboxyl end group content: 48 mmol/kg; VESTAMID® L 2124—HÜLS AG)

PA 3: Polyamide 6.12 ($\eta_{rel}$: 1.9; plasticizer content: 0)

B. Component II

The polyglutarimides comprise the basic building blocks designated as i) to iv) in Claim 8, where Alkyl and $R_1$ to $R_5$ are methyl groups.

The mixtures for the component II. are prepared in a twin-screw kneader at a compound temperature of 280° C.

Composition of the polyglutarimides used in the examples:

|  | Polyglutarimide | | Melt Flow Index [g/10 min.] polyglutarimide | |
| --- | --- | --- | --- | --- |
| Amount | A | B | A | B |
| i) wt. % | 18 | 57 | | |
| ii) wt. % | 77 | 30 | | |
| iii) wt. % | 3 | 3 | 0.4 | 0.4 |
| iv) wt. % | 2 | 10 | | |

Z 1: Mixture of
a. 50 parts by weight of polyamide 12 ($\eta_{rel}$: 2.1; plasticizer content: 0; amino end groups: 9 mmol/kg; carboxyl end groups: 48 mmol/kg; VESTAMID® L 2140, HÜLS AG) and
b. 50 parts by weight of polyglutarimide A Z 2: Mixture of
a. 70 parts by weight of polyamide 12 ($\eta_{rel}$: 2.1; plasticizer content: 0; amino end groups: 9 mmol/kg; carboxyl end groups: 48 mmol/kg; VESTAMID® L 2140, HÜLS AG) and
b. 30 parts by weight of polyglutarimide A Z 3: Mixture of
a. 70 parts by weight of polyamide 12 ($\eta_{rel}$: 1.8; plasticizer content: 0; amino end groups: 6 mmol/kg; carboxyl end groups: 73 mmol/kg; VESTAMID® L 1801, HÜLS AG) and
b. 30 parts by weight of polyglutarimide B Z 4: Mixture of
a. 60 parts by weight of polyamide 12 ($\eta_{rel}$: 2.1; plasticizer content per 100 parts by weight of polyamide: 15 parts by weight of N-n-butylbenzenesulphonamide; amino end groups: 9 mmol/kg; carboxyl end groups: 48 mmol/kg; VESTAMID® L 2124, HÜLS AG) and
b. 40 parts by weight of polyglutarimide A Z 5: Mixture of
a. 80 parts by weight of polyamide 12 ($\eta_{rel}$: 2.1; plasticizer content per 100 parts by weight of polyamide: 15 parts by weight of N-n-butylbenzenesulphonamide; amino end groups: 9 mmol/kg; carboxyl end groups: 48 mmol/kg; VESTAMID® L 2124, HÜLS AG) and
b. 20 parts by weight of polyglutarimide B C. Component III PVDF 1: Polyvinylidene fluoride (Melt flow index: 13 g/10 min., DYFLOR® LE-HÜLS AG)

PVDF 2: Polyvinylidene fluoride (Melt flow index: 8.5 g/10 min., DYFLOR® EE—HÜLS AG)

PVDF 3: Polyvinylidene fluoride (Melt flow index: 8.5 g/10 min.; 6 parts by weight of commercial conductive carbon black (KETJEN BLACK™ EC 300—AKZO) per 100 parts by weight of PVDF; DYFLOR® EE—HÜLS AG)

D. Production of the multilayer pipes

The pipes were produced in a laboratory extrusion facility having a five-layer tool (in the production of the pipes, the appropriate number of channels remains closed in each case). The barrel temperatures were 230° C. (PA 1, PA 2, PA 3), 250° C. (PVDF 1, PVDF 2, PVDF 3), 260° C. (Z 2, Z 3, Z 4, Z 5) and 280° C. (Z 1).

The wall thickness of the 3-layer pipes was from the outside to the inside: 0.75 mm/0.07 mm/0.18 mm. In the 2-layer pipes the wall thickness was from the outside to the inside: 0.82 mm/0.18 mm, and the single-layer pipes had a wall thickness of 1 mm.

TABLE

| Experiment | Outer layer according to I | Intermediate layer according to II | Inner layer according to III | Diffusion [g/d m$^2$] at 23° C. | Mechanically separable at interface | | | |
|---|---|---|---|---|---|---|---|---|
| | | | | | after storage at 23° C. | | after storage in fuel* | |
| | | | | | Layer I/II | Layer II/III | Layer I/II | Layer II/III |
| A | PA 1 | — | — | 30 | — | — | — | — |
| B | PA 2 | — | — | 90 | — | — | — | — |
| C | — | PA 1 | PVDF 1 | 1.2 | — | yes | — | yes |
| 1 | PA 2 | Z 2 | PVDF 1 | 1.2 | no | no | no | no |
| 2 | PA 2 | Z 3 | PVDF 1 | 1.2 | no | no | no | no |
| 3 | PA 1 | Z 4 | PVDF 2 | 1.1 | no | no | no | no |
| 4 | PA 3 | Z 1 | PVDF 3 | 1.4 | no | no | no | no |
| 5 | PA 2 | Z 5 | PVDF 3 | 1.5 | no | no | no | no |
| 6 | Z 5 | Z 5 | PVDF 2 | 1.4 | — | no | — | no |
| 7 | Z 3 | Z 3 | PVDF 2 | 1.6 | — | no | — | no |

Storage at 23° C. for 5 days in standard fuel M 15

What is claimed as new and desired to be secured by Letters Patent of the United States is:

1. A multilayer plastic pipe comprising at least:
   (I) an outer layer,
   (III) an inner layer comprising a moulding composition based on polyvinylidene fluoride, and
   (II) an intermediate layer disposed between said inner layer (III) and said outer layer (I) comprising a moulding composition based on a mixture of
      (a) polyamide, and
      (b) polyglutarimide,
   wherein the adjacent layers (I) to (III) are each adhesively bonded to one another.

2. The multilayer plastic pipe according to claim 1, wherein said layer (I) comprises a moulding composition based on a polyamide.

3. The multilayer plastic pipe according to claim 2, wherein said layer (I) comprises a moulding composition based on polyamide 12.

4. The multilayer plastic pipe according to claim 1, wherein said layer (I) comprises a moulding composition based on a polyamide/polyglutarimide blend.

5. The multilayer plastic pipe according to claim 1, wherein the components (I) and (IIa) are identical.

6. The multilayer plastic pipe according to claim 1, wherein said intermediate layer (II) comprises a moulding composition based on a mixture of:
   (a) of from 40 to 90% by weight of a polyamide, based on the total weight of said layer (II) and
   (b) of from 10 to 60% by weight, based on the total weight of said layer (II) of a polyglutarimide.

7. The multilayer plastic pipe according to claim 6, wherein said intermediate layer (II) comprises a moulding composition based on a mixture of:
   (a) of from 60 to 80% by weight, based on the total weight of said layer (II), of a polyamide, and
   (b) of from 20 to 40% by weight, based on the total weight of said layer (II), of a polyglutarimide.

8. The multilayer plastic pipe according to claim 1, wherein said component (IIb) comprises the following basic building blocks:

i) <100% by weight of

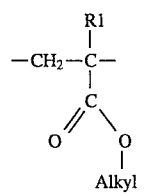

ii) <100% by weight of

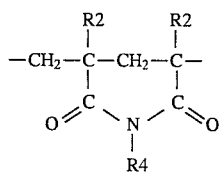

iii) <20% by weight of

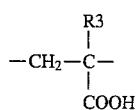

iv) from 1.2 to 20% by weight of

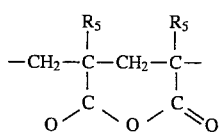

where Alkyl is methyl, ethyl, propyl, butyl, or hexyl; and $R_1$ to $R_5$, identical or different, are hydrogen or $(C_nH_{2n+1})$ where n is an integer of from 1 to 6.

9. The multilayer plastic pipe according to claim 8, wherein said component (IIb) comprises the following basic building blocks:

i) from 10 to 60% by weight of

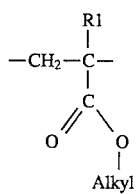

ii) from 30 to 80% by weight of

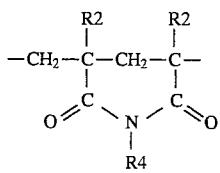

iii) from 2 to 10% by weight of

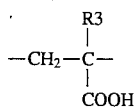

iv) from 1.5 to 12% by weight of

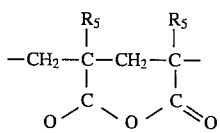

where Alkyl is methyl, ethyl, propyl, butyl, or hexyl; and $R_1$ to $R_5$, identical or different, are hydrogen or $(C_nH_{2n+1})$ where n is an integer of from 1 to 6.

10. The multilayer plastic pipe according to claim 8, wherein said component (IIb) comprises from 2 to 10% by weight of

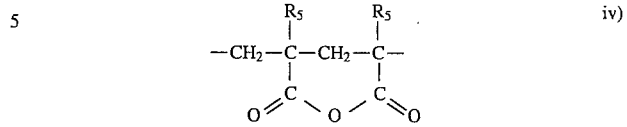

where $R_5$ is hydrogen or $(C_nH_{2n+1})$ where n is an integer of from 1 to 6.

11. The multilayer plastic pipe according to claim 8, wherein Alkyl and $R_1$ to $R_5$ are each methyl.

12. The multilayer plastic pipe according to claim 1, wherein said inner layer (III) comprises a moulding composition based on a polyvinylidene fluoride having a melt flow index of <17 g/10 min.

13. The multilayer plastic pipe according to claim 12, wherein said inner layer (III) comprises a moulding composition based on a polyvinylidene fluoride having a melt flow index of from 2 to 13 g/10 min.

14. The multilayer plastic pipe according to claim 1, wherein said inner layer (III) comprises a moulding compound based on a polyvinylidene fluoride copolymer.

15. The multilayer plastic pipe according to claim 1, wherein said inner layer (III) is electrically conductive and has a surface resistance of $<10^9 \Omega$.

16. The multilayer plastic pipe according to claim 1, wherein said inner layer (III) comprises:

(a) an outer layer based on polyvinylidene fluoride, and (b) an adjacent layer on the inside which is electrically conductive and has a surface resistance of $<10^9 \Omega$.

17. A method for transporting (petro)chemical substances comprising flowing said substances through a multilayer plastic pipe comprising:

(I) an outer layer, (III) an inner layer comprising a moulding composition based on polyvinylidene fluoride, and (II) an intermediate layer disposed between said inner layer (III) and said outer layer (I) comprising a moulding composition based on a mixture of (a) polyamide, and (b) polyglutarimide, wherein the adjacent layers (I) to (III) are each adhesively bonded to one another.

18. A method for carrying brake, cooling and hydraulic fluids or fuel in a motor vehicle comprising flowing said fluid or fuel through a multilayer plastic pipe comprising:

(I) an outer layer, (III) an inner layer comprising a moulding composition based on polyvinylidene fluoride, and (II) an intermediate layer disposed between said inner layer (III) and said outer layer (I) comprising a moulding composition based on a mixture of (a) polyamide, and (b) polyglutarimide, wherein the adjacent layers (I) to (III) are each adhesively bonded to one another.

19. A hollow body comprising a multilayer plastic pipe comprising:

(I) an outer layer, (III) an inner layer comprising a moulding composition based on polyvinylidene fluoride, and (II) an intermediate layer disposed between said inner layer (III) and said outer layer (I) comprising a moulding composition based on a mixture of (a) polyamide, and
(b) polyglutarimide,
wherein the adjacent layers (I) to (III) are each adhesively bonded to one another.

20. A filling port or tank comprising a multilayer plastic pipe comprising:
(I) an outer layer,
(III) an inner layer comprising a moulding composition based on polyvinylidene fluoride, and
(II) an intermediate layer disposed between said inner layer (III) and said outer layer (I) comprising a moulding composition based on a mixture of
(a) polyamide, and
(b) polyglutarimide,
wherein the adjacent layers (I) to (III) are each adhesively bonded to one another.

* * * * *